US008447633B2

(12) United States Patent
Freudman

(10) Patent No.: US 8,447,633 B2
(45) Date of Patent: May 21, 2013

(54) METHODS AND SYSTEMS FOR PROVIDING VEHICLE INSURANCE

(75) Inventor: Marco Freudman, Chicago, IL (US)

(73) Assignee: Quotepro, Inc., Chicago, IL (US)

( * ) Notice: Subject to any disclaimer, the term of this patent is extended or adjusted under 35 U.S.C. 154(b) by 124 days.

(21) Appl. No.: 12/839,070

(22) Filed: Jul. 19, 2010

(65) Prior Publication Data

US 2012/0016694 A1    Jan. 19, 2012

(51) Int. Cl.
*G06Q 40/00* (2012.01)

(52) U.S. Cl.
USPC ............................................................. 705/4

(58) Field of Classification Search
USPC ............................................................. 705/4
See application file for complete search history.

(56) References Cited

U.S. PATENT DOCUMENTS

| 2002/0091550 | A1* | 7/2002 | White et al. | 705/4 |
|---|---|---|---|---|
| 2004/0236614 | A1* | 11/2004 | Keith | 705/4 |
| 2008/0126138 | A1* | 5/2008 | Cherney et al. | 705/4 |
| 2009/0055226 | A1* | 2/2009 | Tritz et al. | 705/4 |
| 2009/0276369 | A1* | 11/2009 | Mabry et al. | 705/36 R |

OTHER PUBLICATIONS

Garry Pursell. Rate Control and Government Competition in Australian non-Life Insurance. Journal of Risk and Insurance (pre-1986); Jun. 1967; 34, 2; ProQuest Central. p. 237.*
Hood et al. UK Policy on Enforcement of Compulsory Motor Insurance: A Choice Between Ever Greater Complexity or A Radically Simpler Model. Journal of Insurance REgulation; Spring 2005; 23, 3; ProQuest Central. p. 55.*
Anonymous. Maximum Processing and QuotePro Inc.: Stingray System functionality to include real-time comparative rating through QuotePro. PR Newswire [New York] May 12, 2010.*

* cited by examiner

*Primary Examiner* — Muriel Tinkler
(74) *Attorney, Agent, or Firm* — McAndrews, Held & Malloy, Ltd.

(57) ABSTRACT

According to certain embodiments of the present invention, a method is provided to determine (at a server) an initial first insurance rate for Provider A and a first insurance rate for Provider B. Both the initial first insurance rate for Provider A and the first insurance rate for Provider B correspond to a first insurance type. The initial first insurance rate for Provider A is adjusted A according to a first adjustment rule to form an adjusted first insurance rate for Provider A. A lower of the adjusted first insurance rate for Provider A or the first insurance rate for Provider B is selected. The adjusted first insurance rate for Provider A may be greater than the initial first insurance rate for Provider A and less than the first insurance rate for Provider B. An application fee for the adjusted first insurance rate for Provider A may be greater than an application fee for the initial first insurance rate for Provider A.

18 Claims, 11 Drawing Sheets

FIG 4

| POSSIBLE INFORMATION | EXPANDED SET | LIMITED SET |
|---|---|---|
| LAST NAME | X | X |
| FIRST NAME | X | X |
| STATE | X | X |
| CITY | X | X |
| ZIP CODE | X | X |
| ADDRESS | X | |
| HOME PHONE | X | |
| WORK PHONE | X | |
| EMAIL ADDRESS | X | |
| SOURCE | X | |
| LEAD | X | |
| LANGUAGE | X | |
| SUB AGENCY | X | |
| BRANCH | X | |
| TERM QUOTE | X | |
| REGULAR QUOTE | X | |
| CUSTOMER STATUS | X | |
| PREVIOUS INSURANCE | X | |
| MISCELLANEOUS DISCOUNTS | X | |
| INSPECTION DONE | X | |
| IS VEHICLE LEASED | X | |
| DOB | X | X |
| MARITAL STATUS AND GENDER | X | X |
| USE OF CAR | X | |
| MILES DRIVEN TO WORK | X | |
| OCCUPATION | X | X |
| MONTHS LICENSED/LICENSE TYPE | X | X |
| DRIVER'S LICENSE NUMBER | X | |
| SOCIAL SECURITY NUMBER | X | |
| DRIVER ADDONS | X | |
| CUSTODIAL DISCOUNT | X | |
| GOOD STUDENT DISCOUNT | X | |
| DRIVING RECORD | X | |
| FINANCIAL RESPONSABILITY - OR SR 22 | X | |
| LIST ANY VIOLATIONS | X | |
| ANY VIOLATION IN LAST 3 YEARS? | | X |
| AGE WHEN FIRST LICENSED | | X |

| POSSIBLE INFORMATION | EXPANDED SET | LIMITED SET |
|---|---|---|
| RELATIONSHIP TO DRIVER #X | X | |
| VIN | X | X |
| YEAR | X | X |
| MAKE MODEL | X | X |
| BODY TYPE OR TRIM | X | X |
| ENGINE | | X |
| OPTIONAL EQUIPMENT | X | |
| ACTUAL CASH VALUE | X | |
| BILL OF SALE | X | |
| SYMBOL/AGE OF CAR | X | |
| TYPE OF ROOF | X | |
| CONVERSION VAN | X | |
| ALARM DISCOUNT | X | |
| BODILY INJUSRY LIMITS | X | |
| PROPERDY DAMAGE LIMITS | X | |
| MEDICAL LIMITS | X | |
| UNISURED MOTORIST LIMITS | X | |
| UNDER INSURED MOTORIST LIMITS | X | |
| UMPD LIMITS | X | |
| COMPREHENSIVE LIMITS | X | |
| COLLISION LIMITS | X | |
| TOWINGF | X | |
| RENTAL | X | |
| ADDITIONAL EQUIPMENT | X | |
| VEHICLE ADD-ONS | X | |

FIG 5

| POSSIBLE INFORMATION | EXPANDED SET | LIMITED SET |
|---|---|---|
| EMAIL ADDRESS | | X |
| CREATE PASSWORD | | X |
| CONFIRM PASSWORD | | X |
| SELECT COVERAGE | X | |
| BILLING OPTIONS | X | |
| PAYMENT OPTION | X | |
| DOWN PAYMENT OPTION | X | |
| ADDITIONAL PAYMENTS | X | |
| FIRST PAYMENT DATE | X | |
| ADD-ON COVERAGES DOWNPAYMENT | X | |
| ADD-ON COVERAGES CASH | X | |
| ADD-ON COVERAGES BALANCE DUE FINANCE | X | |
| TOTAL PREMIUM | X | |
| DIRECT BILL DOWN PAYMENT | X | |
| DIRECT BILL FINANCED | X | |
| CASH ITEMS | X | |
| BALANCE DUE | X | |
| DOWN PAYMENT PERCENTAGE FOR FINANCED ITEMS | X | |
| ADD-ON COVERAGE BALANCE DUE | X | |
| TOTAL DOWN PAYMENT | X | |
| AMOUNT TO FINANCE | X | |
| NUMBER OF PAYMENTS | X | |
| FINANCE CHARGES | X | |
| PAYMENT AMOUNT | X | |
| DOWN PAYMENT DATE | X | |
| FIRST PAYMENT DATE | X | |
| FINANCE COMPANY | X | |
| INPUT AND PRINT SCREEN PAGE | X | |
| CONFIRM LAST NAME | X | |
| CONFIRM FIRST NAME | X | |
| CONFIRM ADDRESS | X | X |
| CONFIRM CITY | X | |
| CONFIRM ZIP | X | |

| POSSIBLE INFORMATION | EXPANDED SET | LIMITED SET |
|---|---|---|
| CONFIRM STATE | X | |
| CONFIRM ZIP CODE | X | |
| CONFIRM DATE OF BIRTH | X | |
| CONFIRM AGE | | X |
| CONFIRM PHONE NUMBER | X | X |
| CONFIRM MARITAL STATUS | X | |
| CONFIRM DRIVERS LICENSE NUMBER | X | |
| CONFIRM STATE LICENSED | X | X |
| CONFIRM YEARS LICENSED | X | X |
| SOCIAL SECURITY NUMBER | X | |
| USAGE AMOUNT % | X | X |
| CONFIRM RELATIONSHIP TO DRIVER #1 | X | X |
| CONFIRM OCCUPATION | X | X |
| EMPLOYER NAME | X | X |
| EMPLOYER ADDRESS | X | X |
| EMPLOYER CITY | X | X |
| EMPLOYER STATE | X | X |
| EMPLOYER ZIP CODE | X | X |
| EMPLOYER PHONE NUMBER | X | X |
| LICENSED REVOKED/SUSPENDED | X | X |
| INSURANCE CANCELLED, DECLINED | X | X |
| MENTAL, PHYSICAL IMPAIRMENT | X | X |
| EVER HAD A CAR LOSS/FIRE | X | X |
| AT ADDRESS MORE THAN 1 YEAR | X | X |
| ARMED FORCED/STUDENT | X | X |
| EVER HAD A CAR STOLEN | X | X |
| LICENSE RESTRICTED | X | X |
| OWNER OF A CAR(S) | X | X |
| U.S. CITIZEN | X | |
| CONFIRM ACCIDENTS & VIOLATIONS | X | |
| F/R CASE NUMBER | X | |
| F/R DATE | X | |
| F/R REASONS | X | |
| PREVIOUS CARRIER NAME | X | |
| PREVIOUS CARRIER POLICY NUMBER | X | |
| PREVIOUS CARRIER EFFECTIVE DATE | X | |
| PREVIOUS CARRIER EXPIRATION DATE | X | |

FIG 5 Cont.

| POSSIBLE INFORMATION | EXPANDED SET | LIMITED SET |
|---|---|---|
| ANY EXLUDED DRIVERS | X | X |
| CONFIRM YEAR | X | |
| CONFIRM MAKE MODEL | X | |
| CONFIRM BODY TYPE OR TRIM | X | |
| CONFIRM OPTIONAL EQUIPMENT | X | |
| CONFIRM ACTUAL CASH VALUE | X | |
| CONFIRM BILL OF SALE | X | |
| CONFIRM SYMBOL | X | |
| CONFIRM CLASS | X | |
| CONFIRM VIN | X | |
| VEHICLE WHEN PURCHASED | X | |
| PURCHASED NEW/USED | X | |
| ODOMETER | X | |
| CONFIRM ANNUAL MILEAGE | X | X |
| MILES TO WORK | | X |
| DOES VEHICLE HAVE A LIEN | | X |
| LOSS PAYEE NAME | X | |
| LOSS PAYEE ADDRESS | X | |
| LOSS PAYEE CITY | X | |
| LOSS PAYEE STATE | X | |
| LOSS PAYEE ZIP | X | |
| SPECIAL EQUIPMENT DESCRIPTION | X | |
| HAS THE VEHICLE BEEN DAMAGED/ALTERED | X | |
| DAMAGE DESCRIPTION | X | |
| COLOR | X | |
| SPECIAL PAINT | X | |
| CAR PHONE | X | |
| AIR BAG | X | |
| SPOILER | X | |
| ANTI-THEFT DEVICES | X | |
| LANDAU TOP | X | |
| VINYL TOP | X | |
| BUCKET SEATS | X | |
| AM/FM STEREO | X | |
| TAPE PLAYER | X | |
| CD PLAYER | X | |

| POSSIBLE INFORMATION | EXPANDED SET | LIMITED SET |
|---|---|---|
| A/C | X | |
| USED FOR BUSINESS | X | |
| CAMPER TOP | X | |
| SPECIAL WHEEL COVERS | X | |
| MAG WHEELS | X | |
| TODAY'S DATE | X | |
| TODAY'S TIME | X | |
| CSR NAME | X | |
| BIND APPLICATION | X | |
| BINDER NAME | X | |
| BINDER NUMBER | X | |
| BINDING DATE | X | |
| BINDING TIME | X | |
| POLICY TYPE | | X |
| POLICY EFFECTIVE DATE | X | X |
| POLICY EXPIRATION DATE | X | |
| EFFECTIVE TIME | X | |
| TERM | X | X |
| INSPECTION DATE | X | |
| INSPECTION TIME | X | |
| INSPECTOR | X | |
| LOCATION | X | |
| GARAGED DURING DAY | X | |
| GARAGED DURING NIGHT | X | |
| GARAGE LOCATION | X | X |
| ANY CHILD IN HOUSEHOLD UNDER 18 | X | X |
| OTHER RESIDENTS NOT LISTED | X | X |
| ANY OTHER CAR IN HOUSEHOLD | X | X |

RESULTS OF FIRST RATE CALL — 710

| Provider Name | Liability Only | Physical Damage $250 Deductible | Physical Damage $500 Deductible | Full Coverage $250 Deductible | Full Coverage $500 Deductible |
|---|---|---|---|---|---|
| Provider A | $230 | $500 | $400 | $1000 | $600 |
| Provider B | $220 | $525 | $440 | $600 | $600 |
| Provider C | $240 | $600 | $480 | $960 | $500 |

ADJUSTMENT RULES — 720

| Provider Name | Liability Only | Physical Damage $250 Deductible | Physical Damage $500 Deductible | Full Coverage $250 Deductible | Full Coverage $500 Deductible |
|---|---|---|---|---|---|
| Provider A | $20 discount | Up to a $30 increase | None | 25% discount | Up to a 25% discount |
| Provider B | None | None | Up to a $50 discount | 15% discount or up to a 25% increase | Up to a 10% discount |
| Provider C | $25 discount | None | Up to a $30 discount | None | Up to a 20% discount |

RESULTS OF SECOND RATE CALL — 730

| Provider Name | Liability Only | Physical Damage $250 Deductible | Physical Damage $500 Deductible | Full Coverage $250 Deductible | Full Coverage $500 Deductible |
|---|---|---|---|---|---|
| Provider A | $210 | $524 | $400 | $750 | $450 |
| Provider B | $220 | $525 | $399 | $749 | $540 |
| Provider C | $215 | $600 | $450 | $960 | $449 |

Provider A
Insurance Rate

| Application Fee | Provider A Rate |

Provider B
Insurance Rate

| Application Fee | Provider B Rate |

Provider C
Insurance Rate

| Application Fee | Provider C Rate |

METHODS AND SYSTEMS FOR PROVIDING VEHICLE INSURANCE

This application claims priority to U.S. Provisional Patent Application No. 60/977,203, filed on Oct. 3, 2007, and U.S. patent application Ser. No. 11/965,386, filed on Dec. 27, 2007, which are herein incorporated by reference.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Generally, the present application relates to comparative insurance quoting and rating. Particularly, the present application relates to vehicle insurance, although the principles set forth herein may be applicable to other types of insurance—e.g., home owner, renter, property, life, health, and others.

Insurance products are priced according to various factors. For example, vehicle insurance may be priced according to an underwriting class that may account for factors such as a driver's age, gender, location, driving record, and type of vehicle to be insured.

While there may be some similarities in the types of information that are accounted for when pricing an insurance policy, different insurance providers may arrive at different rates, even when customer's set of circumstances is substantially the same. Some vehicle insurance purchasers or customers may want to purchase the lowest priced policy. Comparative insurance rating or quoting is one way of addressing the wants of these customers. Through comparative insurance rating, a customer can compare the insurance rates from a variety of providers or agents. This is helpful for the customer. It would also be helpful to provide techniques that can help the providers or agents during the comparative insurance rating processes.

BRIEF SUMMARY OF THE INVENTION

According to certain embodiments of the present invention, a method is provided to determine (at a server) an initial first insurance rate for Provider A and a first insurance rate for Provider B. Both the initial first insurance rate for Provider A and the first insurance rate for Provider B correspond to a first insurance type. The initial first insurance rate for Provider A is adjusted A according to a first adjustment rule to form an adjusted first insurance rate for Provider A. A lower of the adjusted first insurance rate for Provider A or the first insurance rate for Provider B is selected. The adjusted first insurance rate for Provider A may be greater than the initial first insurance rate for Provider A and less than the first insurance rate for Provider B. An application fee for the adjusted first insurance rate for Provider A may be greater than an application fee for the initial first insurance rate for Provider A. A provider rate for the adjusted first insurance rate for Provider A may be substantially the same as a provider rate for the initial first insurance rate for Provider A. Furthermore, the first insurance rate for Provider B may be at least one of an initial first insurance rate for Provider B or an adjusted first insurance rate for Provider B. The first adjustment rule may adjust rates according to at least one of a percentage dollar amount increase, a percentage dollar amount decrease, a flat dollar amount increase, or a flat dollar amount decrease.

In an embodiment, the method further includes determining (at the server) a second insurance rate for Provider A and an initial second insurance rate for Provider B. In this embodiment, the second insurance rate for Provider A and the initial second insurance rate for Provider B correspond to a second insurance type. The initial second insurance rate for Provider B is adjusted according to a second adjustment rule to form an adjusted second insurance rate for Provider B. A lower of the second insurance rate for Provider A or the adjusted second insurance rate for Provider B is selected. In an embodiment, the first insurance type is at least one of liability insurance, physical damage insurance, or full coverage insurance. Furthermore, the second insurance type is different from the first insurance type and comprises at least one of liability insurance, physical damage insurance, or full coverage insurance. The second insurance rate for Provider A may be at least one of an initial second insurance rate for Provider A or an adjusted second insurance rate for Provider A.

According to certain embodiments of the present invention, a system for providing insurance is provided. The system includes: a rules database configured to store a plurality of adjustment rules; and a server including a comparative rating engine. The server is configured to: communicate with the rules database to receive a first adjustment rule, determine an initial first insurance rate for Provider A and a first insurance rate for Provider B, wherein the initial first insurance rate for Provider A and the first insurance rate for Provider B correspond to a first insurance type, adjust the initial first insurance rate for Provider A according to the first adjustment rule to form an adjusted first insurance rate for Provider A, and select a lower of the adjusted first insurance rate for Provider A or the first insurance rate for Provider B.

In an embodiment server is further configured to: communicate with the rules database to receive a second adjustment rule, determine an second insurance rate for Provider A and an initial second insurance rate for Provider B, wherein the second insurance rate for Provider A and the initial second insurance rate for Provider B correspond to a second insurance type adjust the initial second insurance rate for Provider B according to a second adjustment rule to form an adjusted second insurance rate for Provider B, and select a lower of the second insurance rate for Provider A or the adjusted second insurance rate for Provider B. The first insurance type may include at least one of liability insurance, physical damage insurance, or full coverage insurance. The second insurance type may be different from the first insurance type and may include at least one of liability insurance, physical damage insurance, or full coverage insurance.

In an embodiment, the adjusted first insurance rate for Provider A is greater than the initial first insurance rate for Provider A and less than the first insurance rate for Provider B. Also, an application fee for the adjusted first insurance rate for Provider A may be greater than an application fee for the initial first insurance rate for Provider A. Furthermore, a provider rate for the adjusted first insurance rate for Provider A may be substantially the same as a provider rate for the initial first insurance rate for Provider A.

In an embodiment, the first insurance rate for Provider B includes at least one of an initial first insurance rate for Provider B or an adjusted first insurance rate for Provider B. In another embodiment, the second insurance rate for Provider A includes at least one of an initial second insurance rate for Provider A or an adjusted second insurance rate for Provider A.

According to certain embodiments of the present invention, a non-transitory computer readable medium including a set of instructions for execution by a computer is provided. The set of instructions includes a determination routine configured to determine an initial first insurance rate for Provider A and a first insurance rate for Provider B. The initial first insurance rate for Provider A and the first insurance rate for Provider B correspond to a first insurance type. The set of instructions also includes an adjustment routine configured to adjust the initial first insurance rate for Provider A according to a first adjustment rule to form an adjusted first insurance rate for Provider A. The set of instructions further includes a selection routine configured to select a lower of the adjusted first insurance rate for Provider A or the first insurance rate for Provider B.

In an embodiment the set of instructions includes a determination routine configured to determine a second insurance rate for Provider A and an initial second insurance rate for Provider B. In this embodiment, the second insurance rate for Provider A and the initial second insurance rate for Provider B correspond to a second insurance type. The embodiment further includes an adjustment routine configured to adjust the initial second insurance rate for Provider B according to a second adjustment rule to form an adjusted second insurance rate for Provider B. Also included in the set of instructions is a selection routine configured to select a lower of the second insurance rate for Provider A or the adjusted second insurance rate for Provider B. The first insurance type may include at least one of liability insurance, physical damage insurance, or full coverage insurance. Also, the second insurance type may be different from the first insurance type and comprises at least one of liability insurance, physical damage insurance, or full coverage insurance.

In an embodiment, the adjusted first insurance rate for Provider A is greater than the initial first insurance rate for Provider A and less than the first insurance rate for Provider B. Also, an application fee for the adjusted first insurance rate for Provider A may be greater than an application fee for the initial first insurance rate for Provider A. Furthermore, a provider rate for the adjusted first insurance rate for Provider A may be substantially the same as a provider rate for the initial first insurance rate for Provider A.

In an embodiment of the set of instructions, the first insurance rate for Provider B includes at least one of an initial first insurance rate for Provider B or an adjusted first insurance rate for Provider B. The second insurance rate for Provider A may include at least one of an initial second insurance rate for Provider A or an adjusted second insurance rate for Provider A. Also, the first adjustment rule may adjust rates according to at least one of a percentage dollar amount increase, a percentage dollar amount decrease, a flat dollar amount increase, or a flat dollar amount decrease.

BRIEF DESCRIPTION OF SEVERAL VIEWS OF THE DRAWINGS

FIG. 4 shows a chart representing a limited set of information for providing a quote, according to an embodiment of the present invention.

FIG. 5 shows a chart representing a limited set of information for purchasing an insurance policy, according to an embodiment of the present invention.

FIG. 7 shows a user interface display, according to an embodiment of the present invention.

FIG. 8 shows a conceptual diagram of insurance rates, according to an embodiment of the present invention.

Figure 1:
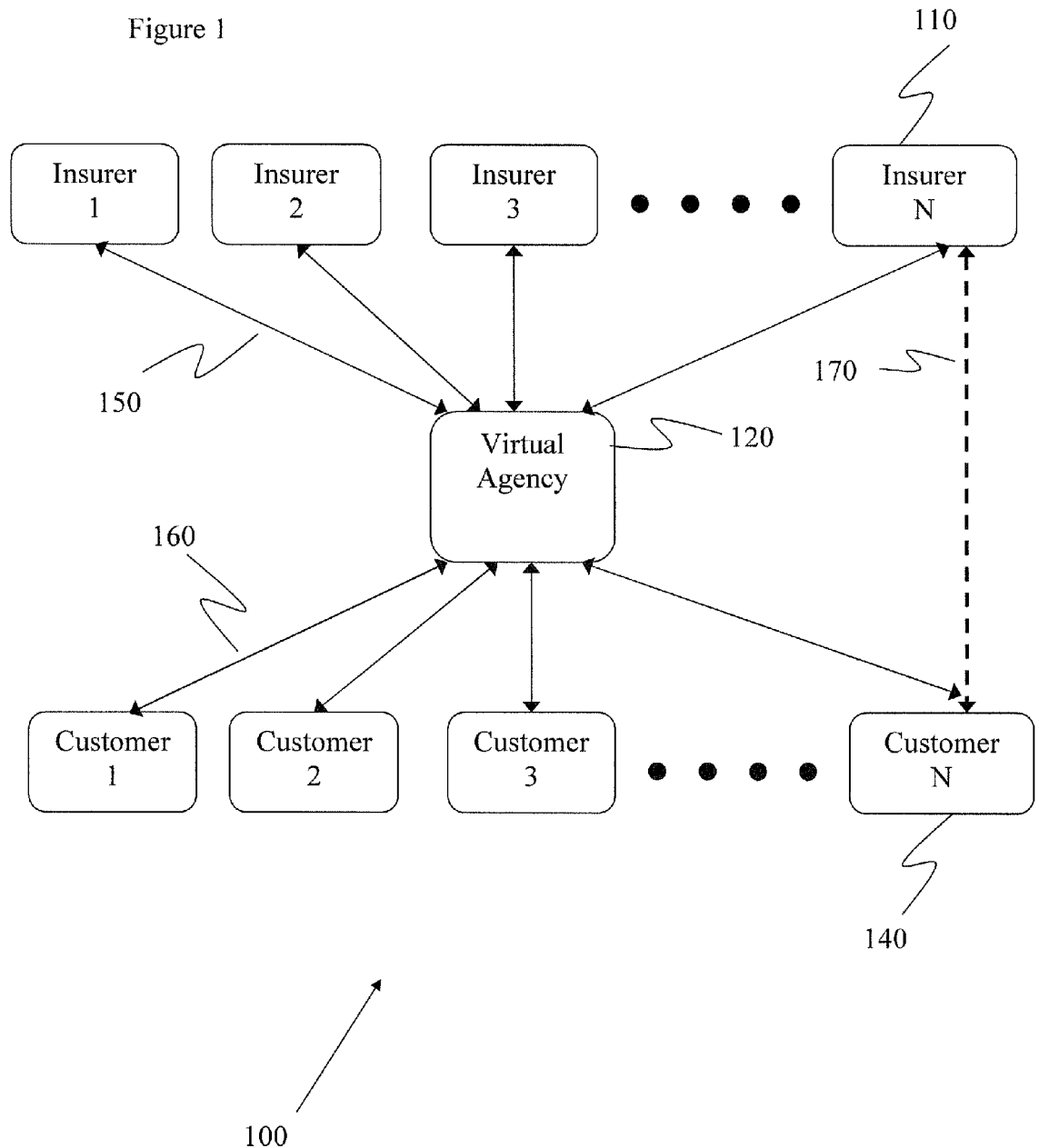
FIG. 1 shows a system for providing insurance transactions, according to an embodiment of the present invention.

The foregoing summary, as well as the following detailed description of certain embodiments of the present invention, will be better understood when read in conjunction with the appended drawings. For the purposes of illustration, certain embodiments are shown in the drawings. It should be understood, however, that the claims are not limited to the arrangements and instrumentality shown in the attached drawings.

DETAILED DESCRIPTION OF THE INVENTION

FIG. 1 shows a diagram of a system for providing insurance transaction(s), according to an embodiment of the present invention. The system 100 includes, but is not limited to, insurer(s) 110, a virtual agency 120, customer(s) 140 a plurality of communication channels 150 between the insurer(s) 110 and the virtual agency 120, a plurality of communication channels 160 between the virtual agency and the customer(s) 140, and an optional channel 170 between the customer(s) 140 and the insurer(s) 110.

The insurer(s) 110 may be insurance providers that are capable of providing legally binding insurance policies for vehicle insurance. Vehicles may include, but are not limited to, cars, trucks, vans, motorcycles, boats, all-terrain vehicles, snow-mobiles, aircraft, commercial trucks and the like. The customer(s) 140 may be one or more individuals (or agents thereof) who own a vehicle (at least in part), and/or who are capable of purchasing insurance for the vehicle.

The communications channels 160 and 150 may be through the internet, or similar. The communications channels 150 and 160 may be secure and encrypted, for example. The communications channels 150 and 160 may operate over the same communications media channels, and/or may operate over distinct communications media channels (e.g. public internet and private intranet). A customer may be designated an individual server to store statistical data and partially completed deals (e.g., leads). Completed deals or partially completed deals in which an email address has been provided may be stored via an HTTPS post to an Oracle back-end database.

The virtual agency 120 creates relationships (or potential relationships) between a customer 140 and a plurality of insurers 110. The broker 120 can operate substantially automatically. The broker 120 may perform a variety of tasks/functions. The broker 120 may provide an interface for a customer 140. The customer 140 may interact through the interface with respect to a variety of insurance related aspects. For example, the interface may permit the customer 140 to enter personal information and/or information related to a vehicle of the customer. The customer 140 may be able to select and/or adjust choices related to an insurance policy. For example, the customer 140 may be able to select coverage limits, type of policy (e.g. liability only or full coverage), deductible, additional drivers, and/or the like.

The broker 120 may intelligently retrieve a limited set of information from a customer 140 to provide an insurance quote. An example of a limited set of information from a customer 140 for providing a quote is shown in FIG. 4, according to an embodiment of the present invention. As another example, the broker 120 may intelligently retrieve a limited set of information from a customer 140 for purchasing an insurance policy. An example of a limited set of information from a customer 140 for purchasing an insurance policy is shown in FIG. 5, according to an embodiment of the present invention.

Figure 2:
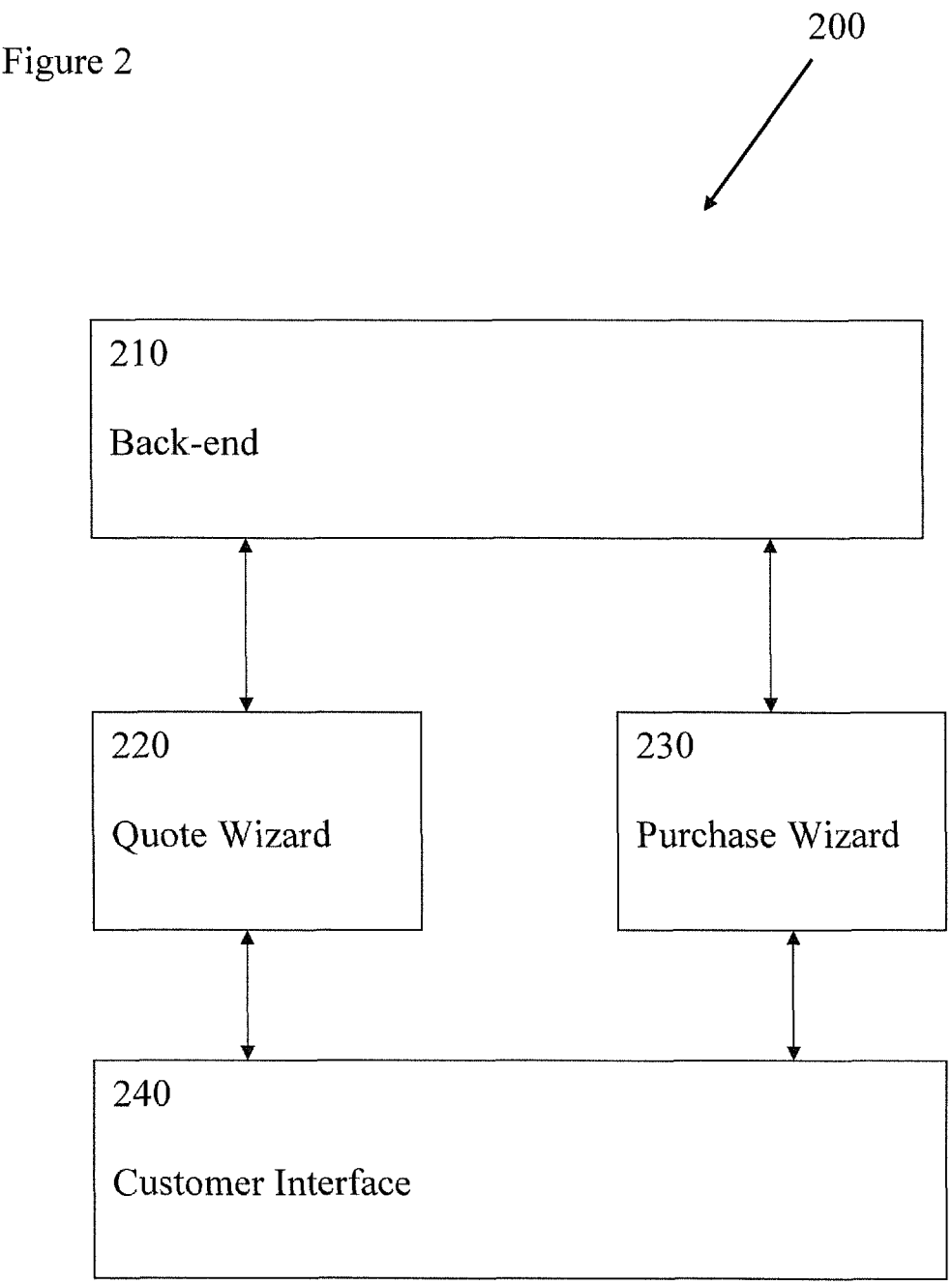
FIG. 2 shows a virtual agency, according to an embodiment of the present invention.

The virtual agency 120 may further include a variety of components/sub-systems. For example, FIG. 2 shows a system 200 that is representative of a virtual agency (e.g., broker 120) according to an embodiment of the present invention. The system 200 may include, but is not limited to, one or more back-end 210, a customer interface 240, a quote wizard 220, and a purchase wizard 230.

A customer interface 240 may be a two-way portal between a customer 140, and a virtual agency 120. The interface 240 may dynamically display data to the customer 140. The data may be displayed at a location of the customer, such as through a web browser. The data may include world-wide-web friendly data, such as HTML, SHTML, or similar data. Alternately, intermediate components may translate data from the customer interface 240 for display at a location of the customer (e.g., an intermediate component may convert data from a form provided by the customer interface 240 into a form viewable through a web browser).

The interface 240 may also retrieve data as provided by the customer 120—either directly, or through intermediate components. The customer 120 may provide data to the interface 240 through a variety of ways: drop-down menu selections, check-box selections, radio button selections, text entry, button clicks, etc. The interface 240, either by itself, or in conjunction with other system components, may provide persistent data sessions. A persistent data session may automatically save the customer's information for a period of time—e.g., three hours. The interface 240 may also provide hyperlinks to trigger form posts. The hyperlinks may assist to store information entered by the customer 140 in a persistent session.

A quote wizard 220 may assist to intelligently retrieve a limited set of information from the customer 140. For example, the quote wizard 220 may assist to display prompting questions to the customer 140. The prompting questions—e.g., name, age, address, vehicle information, etc.—may be dynamically determined by the quote wizard 220. For example, the prompting questions may be determined in response to prior information provided by the customer 140.

For example, the quote wizard 220 may prompt the customer 140 to enter a zip code. The quote wizard 220 may then use the zip code to intelligently choose a state, city, and/or county. In the event that the zip code straddles multiple counties or cities, the quote wizard 220 may further prompt the customer 140 to select between various options.

As another example, the quote wizard 220 may prompt the customer 140 to enter a limited set of information to determine the nature of the customer's vehicle. For example, the quote wizard 220 may employ drop down lists, starting with the year and progressing through the make, model, trim and engine until a unique car is selected. The customer may also enter a Vehicle Identification Number ("VIN") as a shortcut to fill in the other required fields. The quote wizard 220 may dynamically insert or skip prompting questions in order to obtain only the limited set of information necessary to determine a quote.

Likewise, the quote wizard 220 may intelligently prompt the user to enter a limited set of information pertaining to the customer 140. For example, the wizard may prompt the customer to enter the following customer information: name of driver(s), date of birth, gender, license information, occupation, driving violations, and details of the violations.

The quote wizard 220 may facilitate display of one or more insurance quotes to the customer 140. The customer 140 may further interact with the interface 240 to adjust certain aspects of the quote. For example, the customer may be provided two quotes from an insurer. The insurer may be selected by the virtual agency based on a preference—such as a lowest rate. The two quotes may be for full coverage and for liability only. The customer may interact to select coverage limits, deductibles, and other aspects. These interactions may cause the virtual agency to dynamically update the displayed quote(s) to the customer.

The quote wizard 220 may further validate data that is retrieved from the customer 140. Validation may be performed before the quote wizard 220 further communicates the data to the back-end 210. The initial validation may assist to confirm that certain items match. For example, when a zip code is entered, the customer may be directed to select from a possible city and state possibilities for that specific zip code. When an automobile's VIN number is entered, the customer may be directed to select from those vehicles that could possibly contain that VIN. If a moving violation is entered into the system, the customer may be prompted to select from various universal violations that in turn may be mapped to thousands of different surcharges for each company rated. If an invalid date of birth is entered or a driver is too young or old for licensing, the customer may be prohibited from proceeding. If other problematic data is entered (e.g., occupation, etc.), the applicant may be prohibited from proceeding. Information pertinent to the initial quote may be stored on an individual server designated for the customer. Further validation may be required to actually sell or bind the policy. This information may be handled by the purchase wizard. This secondary validation process may gather additional information to complete the binding of the transactions. This additional data may be stored on an Oracle database. This information may contain information on completed deal and partially completed deals in which an email address has been obtained.

After an initial quote is provided and the client may proceed to purchase the policy, the purchase wizard may pick up where the quote wizard left off to complete the transaction. It is at this point that the purchase wizard may gather all the required underwriting information needed to bind the policy. The majority of the underwriting information needed to properly rate and sell a policy may be handled by the quote wizard on a driver detail screen. Examples of such information gathered may include the following: duration of insurance, citizenship, insurance cancellations, driver impairments, valid email and password, valid driver's license, and/or the like.

A purchase wizard 230 may be similar in many respects to a quote wizard 220. The customer may choose to purchase a quoted insurance policy. Then, the purchase wizard 230 may dynamically and intelligently prompt the customer 140 to enter a limited set of information necessary to purchase the insurance policy. The purchase wizard may gather additional underwriting information such as the listing of any excluded drivers that need to be listed on the policy, a re-validation of the vehicle's VIN, the re-validation of policy coverages, and a re-validation of the price and term of the policy, for example. Once this information is gathered, the purchase wizard may prompt the customer to enter various forms of payment for the policy. The purchase wizard may process the payment, validate the availability of funds and may sweep the funds into the owner of the Insurance Agency's bank account. The purchase wizard may store all information to the Oracle Back-end database and may electronically transmit pertinent documents to the email address provided by the customer.

The purchase wizard 230 may validate and/or re-validate data retrieved from the customer 140. For example, the purchase wizard 230 may revalidate the limited set of data retrieved by the quote wizard 220. The purchase wizard 230 may also validate the limited set of information necessary to purchase the insurance policy.

The wizards 220 and 230 may be one or more applications that communicate/interact with the back-end 210 and the interface 240. For example, the wizards may be part of a Rich Internet Application ("RIA"). For example, the wizards in conjunction with the customer interface 240 may be implemented with a programming environment, such as AJAX. The wizards and/or the interface 240 may also provide validation of the retrieved information at the customer interface 240 and/or the back-end 210.

A back-end 210 may interact with the customer interface 240 and the wizards 220, 230. The back-end 210 may be a computer system itself. For example, the back-end may include one or more of the following: databases, servers, processors, non-perishable memory, perishable memory, communications ports, etc. The quote wizard may store data on an agency's database. Once the client goes beyond the quote screen and makes an initial commitment to buy, the purchase wizard may store all completed and partially completed transactions to a master Oracle database.

The back-end 210 may execute one or more applications. For example, the back-end may execute applications written in programming languages, such as Visual FoxPro, or other ".net" languages. One such application(s) may be a ratings engine. The ratings engine may interact with other system components to provide a quote. For example, the ratings engine may employ various sets of rules provided by the insurers. The ratings engine may use a database from which quotes are determined.

The back-end 210 may, for example, receive information from the customer 140 through the wizards and interface. The back-end 210 may process the information with the ratings engine to provide a quote. The back-end may also process the information to execute an insurance policy transaction.

The payment of the policy may be automatically processed by the virtual agency (e.g., 120, or system 200). The virtual agency may substantially immediately (e.g., within seconds or minutes) email to the customer 140 various documents relating to a purchased insurance policy: e.g., application, declaration page, identification cards, and/or other legal documentation. Thus the virtual agency may automatically process and complete an insurance transaction without any intermediate intervention from a human agent or an insurer.

Figure 3:
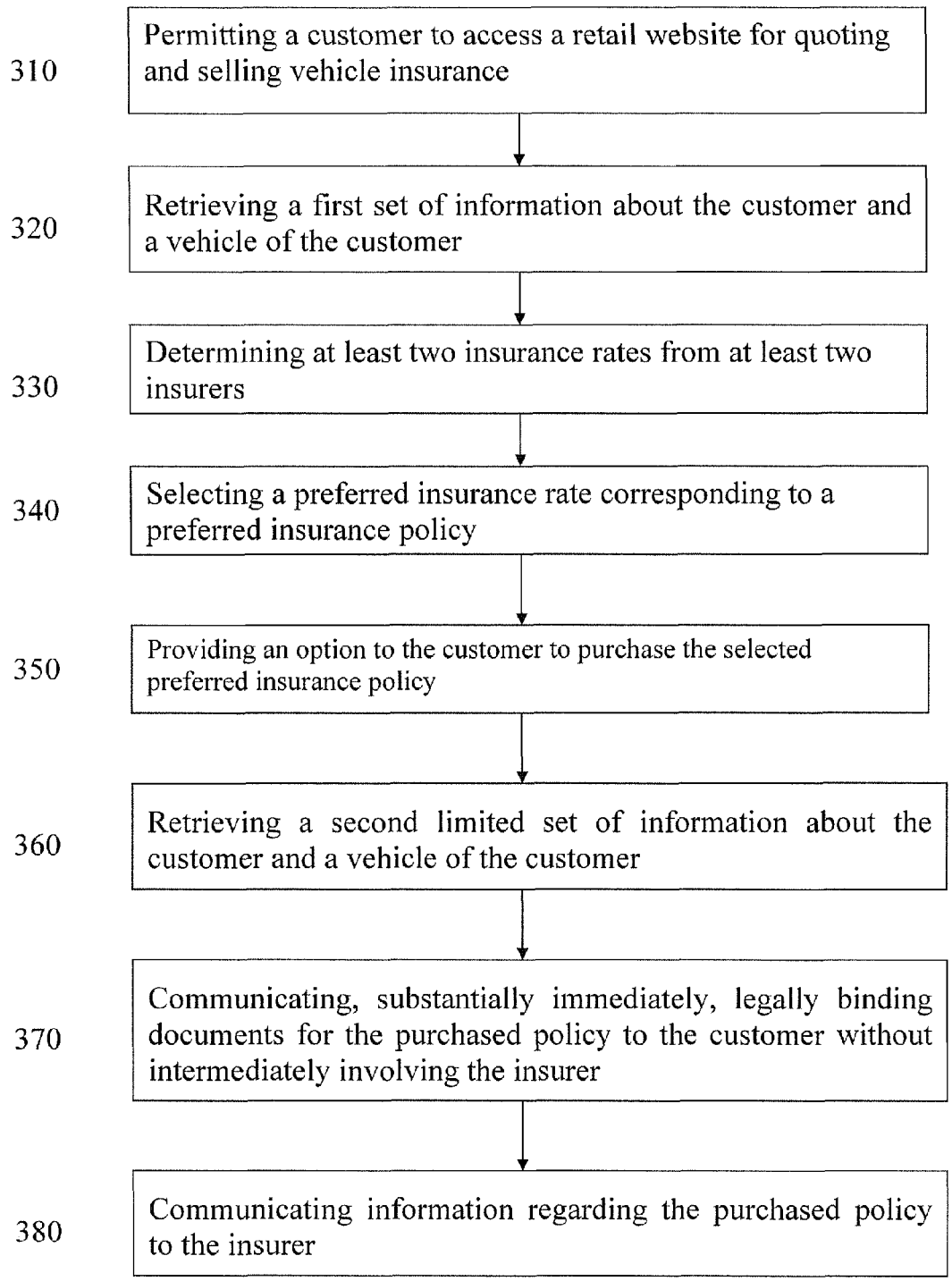
FIG. 3 shows a flowchart for a method of providing insurance transactions, according to an embodiment of the present invention.

Turning to FIG. 3, a flowchart 300 for a method of providing insurance transactions is shown, according to an embodiment of the present invention. The flowchart is shown to have various steps. Some steps may be omitted, and/or may be performed in a different order. Some steps may be performed substantially simultaneously. Method 300, or a portion thereof, may be performable by software, hardware, and/or firmware. Method 300, or a portion thereof, may also be expressible through a set of instructions stored on one of more computer-readable storage media, such as RAM, ROM, EPROM, EEPROM, optical disk, magnetic disk, magnetic tape, and/or the like.

At step 310, a customer is permitted to access a retail website for quoting and selling vehicle insurance. The website may include a customer interface or at least a portion thereof (e.g., customer interface 240). The retail website may be an interface to a virtual agency. The website may be operated by a brokering middleman who has relationships with two or more insurers. The website may allow, as will be discussed further, the customer to automatically purchase a legally binding insurance policy and receive documentation without any human intervention or further intermediary approval. The website may offer persistent data sessions, allowing a customer to return after a period of time without losing previously entered information. The website may include a Rich Internet Application, and may dynamically respond to interactions from the customer.

At step 320, a first set of information about the customer and a vehicle of the customer is retrieved. The first set of information may be retrieved through assistance of a quote wizard (e.g., quote wizard 220). The first set of information may be limited. An example of a limited set of information is shown in FIG. 4. The first set of information may include customer and vehicle information. The first set of information may be the minimum amount of data necessary to provide a vehicle insurance quote. The size of the first set of information may vary based on certain customer-provided information (e.g., the set may be larger if there are driving violations entered). The quote wizard, and/or the back-end, may assist with verification of the first set of information. Validation of vehicle's VIN, the matching of city, state and zip code, acceptable date of birth, and/or the like are all examples of the initial questions that may be resolved in the initial validation process.

At step 330, at least two insurance rates from at least two insurers are determined. The rates may be determined by a virtual agency. Insurance rates may be determined from any number of insurers. The agent that provides the virtual agency may be an authorized broker for the insurers. The rates may be determined through a rating engine, for example. The rates may have a variety of associated aspects—e.g., type of coverage (full-coverage, liability only, etc.), deductibles, coverage limits, etc. The rates may be determined pursuant to a database of rate information corresponding to the insurers. The rates may also be determined by using calculations in accordance with the procedures of the various insurers. The rates may be determined for each insurer. The rates may be determined by a back-end. The rates may be determined by an application running on the back-end, in a language such as Visual FoxPro. The rates may be calculated without any intermediate intervention from the insurers. The rates may be provided substantially immediately—e.g., with seconds or minutes.

At step 340, a preferred insurance rate corresponding to a preferred insurance policy is selected. The selection may be from the various rates determined at step 330. The selection may be made according to a selection preference—e.g., lowest price. The selection may be made automatically. Additionally, the customer may have input during the selection process. For example, the customer may be provided two or more rates. As an example, a customer may request certain coverage limits, deductibles, and policy types that may influence the selection process. The preferred insurance rate may further be displayed to the customer 140—e.g., through a customer interface.

At step 350, an option to the customer to purchase the selected preferred insurance policy is provided. The customer may further interact with the interface to select a different insurance policy, if the quoted policy is not satisfactory. The customer may interact, for example, by altering various aspects of the insurance policy: coverage type, deductibles, coverage limits, etc.

If the customer chooses to purchase the policy, at step 360, a second limited set of information about the customer and a vehicle of the customer is retrieved. The second set of information may be retrieved through assistance of a purchase wizard (e.g., purchase wizard 230). The second set of information may be limited. An example of a second limited set of information is shown in FIG. 5. The second set of information may include additional customer, vehicle, and purchase payment information (e.g., credit card, check, PayPal®, etc.). The second set of information may be the minimum amount of data necessary to transact the purchase of an insurance policy. The size of the second set of information may vary based on certain customer-provided information. The purchase wizard, and/or the back-end, may assist with verification of the first set of information.

At step 370, legally binding documents for the purchased policy are communicated substantially immediately to the customer without intermediately involving the insurer. The legally binding documents may include the following: insurance identification, application, declaration page, and/or the like. One or more of the documents may be communicated through electronic media—e.g., email, fax, etc. Documents may additionally be communicated via postal service(s). Documents may be communicated substantially immediately—in a matter of seconds or minutes. The virtual agency may receive from each insurer a block of policy numbers. The virtual agency may use one of the policy numbers from a block corresponding to the selected insurer. In this manner, the virtual agency may execute the transaction for the legally binding insurance policy without any need for intermediate interaction with the selected insurer (or a human being).

At step 380, information regarding the purchased policy is communicated to the insurer. The information may be communicated automatically or manually to the selected insurer (e.g., uploaded to the insurer automatically).

As an illustrative example method 300 may be performed in the following manner. A customer seeking vehicle insurance accesses a website. The website is part of a virtual agent. The customer wants to see a quote for an insurance policy to evaluate whether he/she will purchase the policy.

Through the user interface of the website, the customer is prompted to enter a limited first set of information. The information is intelligently and dynamically retrieved through the assistance of a quote wizard. Only the information necessary to provide a quote is prompted and retrieved.

The quote wizard verifies the first limited set of information and then communicates the first set of limited information to a back-end. The back-end contains a ratings engine that computes at least two insurance rates corresponding to at least two insurers. The back-end selects the policy with the lowest price, and communicates the policy information to be displayed on the website interface.

The customer views the quote, and decides to purchase the insurance policy. The virtual agency, through a purchase wizard, intelligently retrieves a second limited set of information from the customer. The second set of information includes credit card information. The purchase wizard verifies the credit card information. The virtual agent then automatically executes the insurance transaction. The selected insurance policy is issued from a block of insurance policy numbers provided by the insurer to the virtual agency. The identification card, declaration, and application are emailed to an address provided by the customer. The customer then has a legally binding insurance policy covering his/her vehicle.

Subsequently, the virtual agency then uploads information regarding the purchased policy to the selected insurer. Throughout the process, the only human interaction is from the customer. The rest of the steps are performed automatically.

Figure 6:
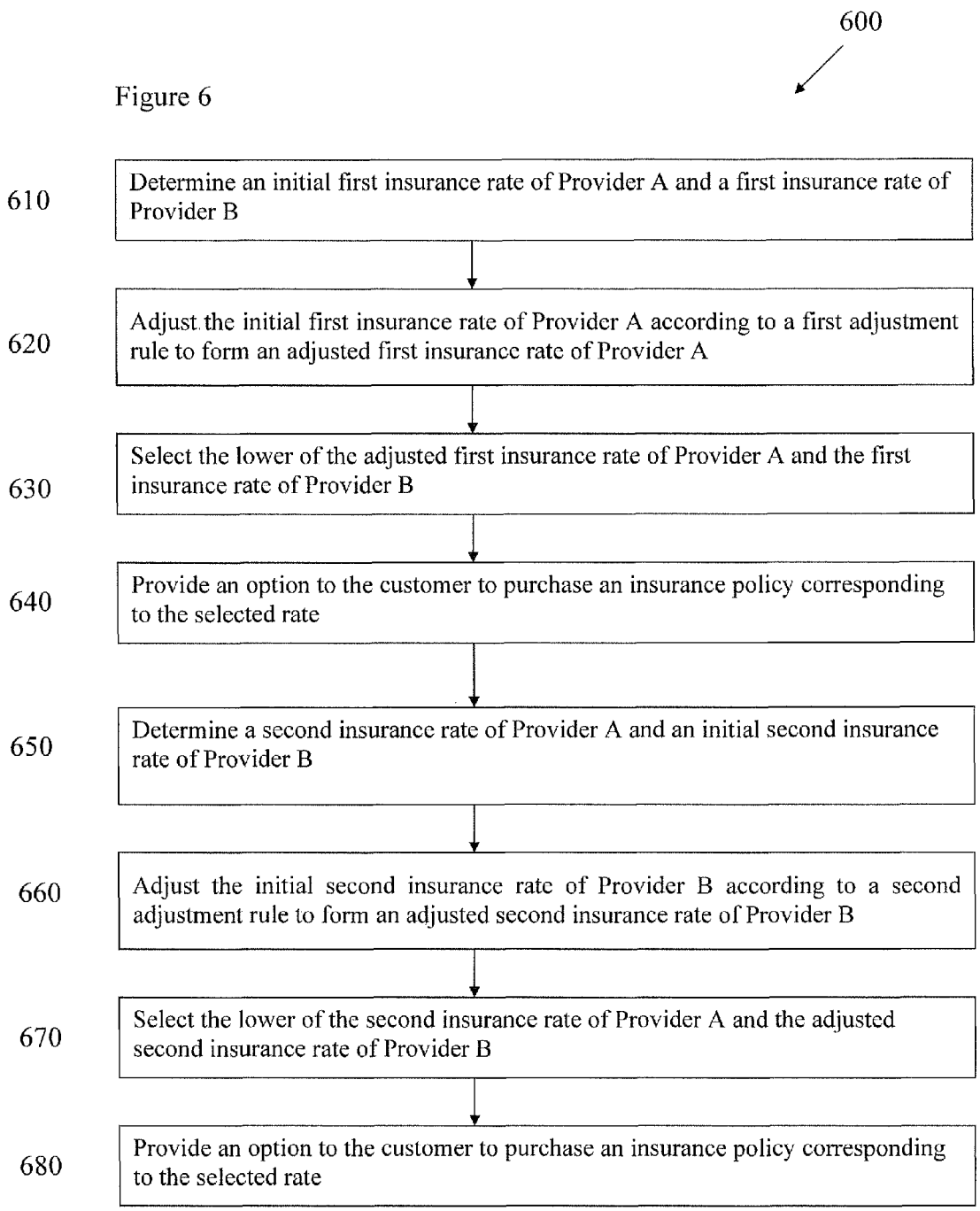
FIG. 6 shows a flowchart for a method of providing vehicle insurance quotes, according to an embodiment of the present invention.

Turning now to FIGS. 6 and 7, a technique for selecting between insurance rates from two different providers is illustrated. FIG. 6 shows a flowchart 600 for a method of providing vehicle insurance quotes, according to an embodiment of the present invention. Insurance quotes, for example, may be provided through one or more agents. The flowchart 600 is shown to have various steps. Some steps may be omitted, and/or may be performed in a different order. Some steps may be performed substantially simultaneously. For example, steps 650, 660, 670, and 680 may not be performed or may be performed before steps 610, 620, 630, and 640. Some or all of the method may be performed by devices such as servers and processors. Similar devices are discussed above in context with the front-end and back-end shown in FIG. 2. Flowchart 600, or a portion thereof, may be performable by software, hardware, and/or firmware. Flowchart 600, or a portion thereof, may also be expressible through a set of instructions stored on one of more computer-readable storage media, such as RAM, ROM, EPROM, EEPROM, optical disk, magnetic disk, magnetic tape, and/or the like.

FIG. 7 shows a user interface display 700 which illustrates aspects of the flowchart 600. The user interface display 700 may be displayed on a display, such as an LCD display, an LED display, a touch screen display, a CRT, a plasma screen, or the like. The user interface display 700 may be displayable at a kiosk. The user interface display 700 may be driven by a server. The display 700 includes three tables: the results of a first rate call 710; the results of a second rate call 730; and adjustment rules 720. Each of the tables shows insurance rates corresponding to three different providers: Provider A; Provider B; and Provider C. As used herein, a provider can be a company or organization, such as a corporation, partnership, sole proprietorship or the like. A provider may be an insurance carrier or an underwriter. Furthermore, two or more providers could be within or associated with one company or organization. For example, an insurance company may have multiple divisions or tiers, each of which could be a provider. As an illustrative example, an insurance company may include a standard tier, a preferred tier, and an extra preferred tier, each of which may be considered a provider. The insurance rates shown in the tables may also correspond to one or more agents. For example, the insurance rates may include, in addition to the provider's rate, an agent's application fee(s).

The insurance rates for each provider are shown in tables 710, 720, and 730 for five different insurance types: Liability Only; Physical Damage $250 Deductible; Physical Damage $500 Deductible; Full Coverage $250 Deductible; and Full Coverage $500 Deductible. Other insurance types may also be possible. For example, insurance types with different deductible amounts or coverage limits may be displayed. Insurance type attributes (such as deductible amount or coverage limit) may be adjustable according to a user or a design preference.

The insurance rates in the tables are shown with respect to a potential customer. The potential customer may be like the customer discussed above. A potential customer may fall within an underwriting class. Such underwriting classes may be defined by one or more different factors, such as gender, age group, vehicle type, zip code, occupation, military record, driving record, or the like. For example, an underwriting class may correspond to males 21-24 years old that live in ZIP code 60202 with two or less motor vehicle violations in the past six months. The insurance rates may be obtained through techniques discussed herein. For example, the insurance rates may be obtained through methods disclosed in FIG. 3 and the corresponding text.

Referring to FIG. 6, at step 610, an initial first insurance rate for Provider A is determined. An initial first insurance rate for Provider A may be determined in a number of manners. For example, a manufactured rate may be used in which Provider A will provide, in advance, its underwriting guidelines and manuals to be manually programmed into the server. For example, the manufactured rate may be entered and stored on a server and used as part of a quote wizard as discussed above. As another example, Provider A may allow access to its system (e.g., a policy issuance system running on Provider A's server) to retrieve the initial first insurance rate. A first insurance rate for Provider B is also determined. The insurance rates may be received as the result of a first rate call. The insurance rates for Providers A and B may correspond to a particular type of insurance (e.g., "Liability Only"). The first insurance rate for Provider B may be an initial first insurance rate or an adjusted first insurance rate. The concept of an adjusted first insurance rate will be further described below.

Table 710 shows an example of insurance rates returned by a first rate call. The insurance rates populated in table 710 may be returned by insurance quoting algorithms or software. For example, the insurance rates populated in table 710 may be returned by a rating engine or a quote wizard, similar to the ones discussed above. The first rate call table 710 includes insurance rate quotes from Providers A, B, and C for each of the five types of insurance. In other examples, each provider may not provide a rate quote for all types or insurances.

At step 620, the initial first insurance rate for Provider A is adjusted according to a first adjustment rule to form an adjusted first insurance rate for Provider A. [THE ADJUSTMENT RULE COULD RESIDE ON A SERVER AS DISCUSSED ABOVE OR ON PROVIDER A'S INTERNAL SYSTEM] Table 720 shows an example of adjustment rules. Table 720 depicts a matrix of adjustment rules for each of the providers and insurance types. The adjustments may be applied to the results from the first rate call (e.g., the insurance rates populated in table 710). If there is adjustment rule for a give provider and insurance type, the table 720 is populated with the word "None". The adjustment rules may be stored in a rules database. The rules database may communicate with one or more servers, such as a server that generates the user interface 700 or executes the flowchart for the method 600 or a back-end such as back-end 210.

The adjustment rules may be determined in advance with the providers so that the rules may be applied substantially in real time. The rules may operate to decrease (e.g., discount) or increase (e.g., surcharge) the insurance rates returned by the first rate call. Examples of adjustment rules are shown in table 720. The adjustment rules may change the insurance rates by a flat dollar amount—e.g., rules of Providers A and C for "Liability Only". The adjustment rules may change the insurance rates by a percentage dollar amount—e.g., rules of Providers A and B for "Full Coverage $250 Deductible". The adjustment rules may allow a provider to change an insurance rate "up to" a specified amount so that the provider does not "over-discount" the insurance rate—e.g., rule for Provider B for "Full Coverage $250 Discount"; and rules for Providers A, B, and C for "Full Coverage $500 Discount". When a rule provides for a discount "up to" a percentage, the rule may operate to limit the amount of discount to only the amount necessary to have the lowest insurance rate. Similarly, when a rule provides for an increase "up to" a percentage, the rule may operate to increase the insurance rate but still have the lowest insurance rate. Using these "up to" types of adjustment rules, a provider can still have the lowest insurance rate without "leaving money on the table". The adjustment rules may employ other types of algorithms or equations to decrease or increase the insurance rates returned by the first rate call. The adjustment rules may also correspond to different aspects of insurance, such as different underwriting classes. An adjustment rule may provide different outputs based on different input factors, or an adjustment rule may only provide one output.

The application of the adjustment rules may be considered a second rate call. In the example shown in FIG. 7, the adjustment rules 720 were applied to the results of the first rate call 710 to generate the results of the second rate call 730.

At step 630, the lower of the adjusted first insurance rate for Provider A and the initial first insurance rate for Provider B is selected to form a selected insurance rate 740. Various examples of the application and selection of lowest insurance rates are shown in FIG. 7. For the "Liability Only" insurance, Provider A ended up with the lowest insurance rate by applying a flat $20 dollar discount. For the "Physical Damage $250 Deductible" insurance, Provider A increased its insurance rate by $24 and still had the lowest rate—$1 less than Provider B. Even though a $30 increase was authorized, a rate increase more than $25 would have meant that Provider A would have a higher adjusted rate than the rate of Provider B.

Looking still at the examples illustrated in FIG. 7, for the "Physical Damage $500 Deductible" insurance, Provider B authorized a discount of up to $50. In the end, it was only necessary to provide a discount of >$40 to beat Provider A's rate. Therefore, a discount of only $41 was applied to make Provider B's adjusted rate lower than Provider A's rate. For the "Full coverage $250 Deductible" type of insurance, Provider A has an adjustment rule authorizing a 25% discount, while Provider B has an adjustment rule authorizing either a 15% discount or up to a 25% increase. Provider A's initial rate is $1000 and after applying a 25% discount adjustment, Provider A's adjusted rate is $750. This rate is still significantly higher than Provider B's initial rate of $600. Provider B has an adjustment rule authorizing up to a 25% increase. This means that Provider B's rate can be increased up to $749 and still be the lowest rate.

Looking still at the examples illustrated in FIG. 7, each of Providers A, B, and C have authorized different discounts for full coverage/$500 deductible. Each of the initial rates is adjusted by the application of a corresponding adjustment rule. Provider C ends up having the lowest adjusted rate, and it was not necessary to apply the full amount of the 20% authorized discount.

Looking back at FIG. 6, at step 640 an option is provided to a customer to purchase the insurance policy corresponding to the selected rate. The selected rates may be the lowest rates as illustrated by the circled rates 740 in FIG. 7.

The method may continue to step 650 in which a second insurance rate for Provider A is determined. An initial second insurance rate for Provider B is also determined. The second insurance rate for Provider A and initial second insurance rate for Provider B may be determined as the result of a first rate call. The second insurance rate for Provider A may also be determined as a result of a second rate call. The second insurance rate for Provider A and initial second insurance rate for Provider B may correspond to a particular type of insurance (e.g., "Physical Damage $500 Deductible") that is different than the type of insurance discussed in conjunction with step 610.

At step 660, the initial second insurance rate for Provider B is adjusted according to a second adjustment rule to form an adjusted second insurance rate for Provider B. Table 720 shows an example of adjusting the initial second insurance rates according to adjustment rules. For example, for the insurance type of "Physical Damage $500 Deductible", Provider B has authorized a discount of up to $50. It is only necessary, however, to apply a discount of >$40 so that Provider B's rate is lower than Provider A's rate. Therefore, Provider B's rate is discounted by $41, resulting in a rate of $399—one dollar less than Provider A's rate.

At step 670, the lower of the adjusted second insurance rate for Provider B and the insurance rate for Provider A is selected. Then at step 680, an option is provided to a customer to purchase the insurance policy corresponding to the selected rate.

The method described in conjunction with flowchart 600 may be expanded or adapted to incorporate other techniques discussed herein. For example, the method described in conjunction with flowchart 600 may be altered to incorporate techniques disclosed in FIG. 3 and the corresponding text. For example, a first set of limited information may be obtained pertaining to the customer and the vehicle of the customer (e.g., step 320). The first set of limited information may be received through the assistance of a quote wizard.

As another example, after the option is provided to the customer to purchase the insurance policy corresponding to the selected rate (e.g., step 640), a second limited set of information may be retrieved (e.g., step 360). Such a second limited set of information may be retrieved through the assistance of a purchase wizard. As yet another example, after the customer purchases the insurance policy, legally binding documents corresponding to the insurance policy may be communicated substantially immediately without intermediately involving the selected insurer (e.g., step 370). Such legally binding documents may include insurance identification, application, or a declaration page.

FIG. 8 shows a conceptual diagram 800 of insurance rates, according to an embodiment of the present invention. Insurance rates for Providers A, B, and C are shown. These insurance rates may be similar to the ones described above. As shown, each insurance rate includes an application fee, in addition to the rate of the provider. The application fee may be the same for each of the provider's insurance rates. The application fee may be a charge added by an agent.

Figure 9:
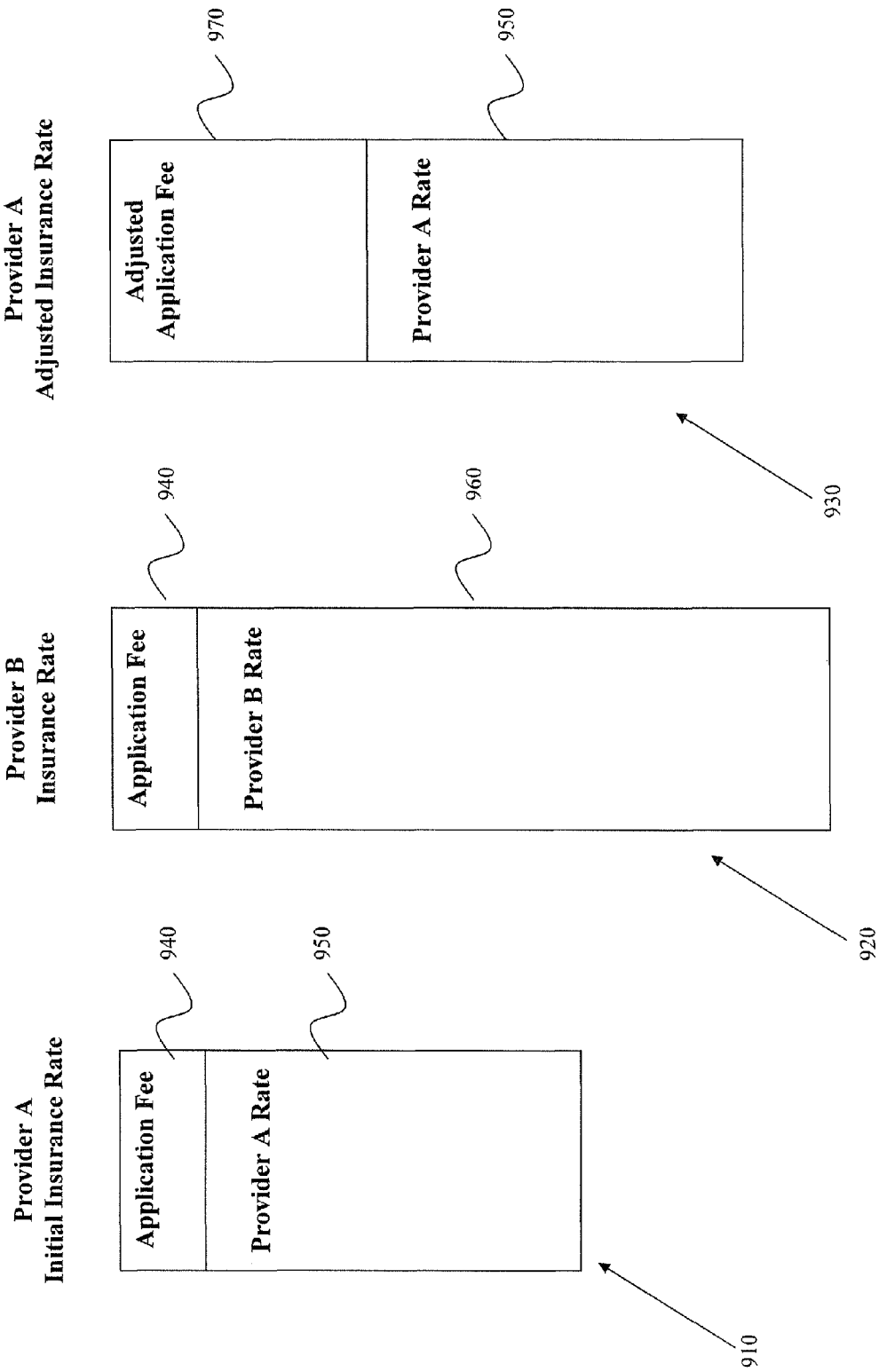
FIG. 9 shows a conceptual diagram for adjusting insurance rates, according to an embodiment of the present invention.

FIG. 9 shows a conceptual diagram 900 for adjusting insurance rates, according to an embodiment of the present invention. The diagram 900 shows Provider A's initial insurance rate 910, Provider B's insurance rate 920, and Provider A's adjusted insurance rate 930. These insurance rates may be similar to those discussed above. As depicted, Provider A's initial insurance rate 910 includes an application fee 940 and Provider A's rate 950. Provider B's insurance rate 920 also includes the application fee 940 as well as Provider B's rate 960. As shown, Provider A's initial insurance rate 910 is less than Provider B's insurance rate.

As discussed above, a customer may desire to choose Provider A's insurance because the rate is lower than Provider B's rate. At the same time, it may be possible to increase the application fee associated with Provider A's rate. As shown, Provider A's adjusted insurance rate includes an adjusted application fee 970, in addition to Provider A's rate 950. The adjusted application fee 970 is greater than the application fee 940 associated with Provider A's initial insurance rate 910 and Provider B's insurance rate 920. Even with the larger adjusted application fee 970, Provider A's adjusted insurance rate 930 is still less than Provider B's insurance rate.

Figure 10:
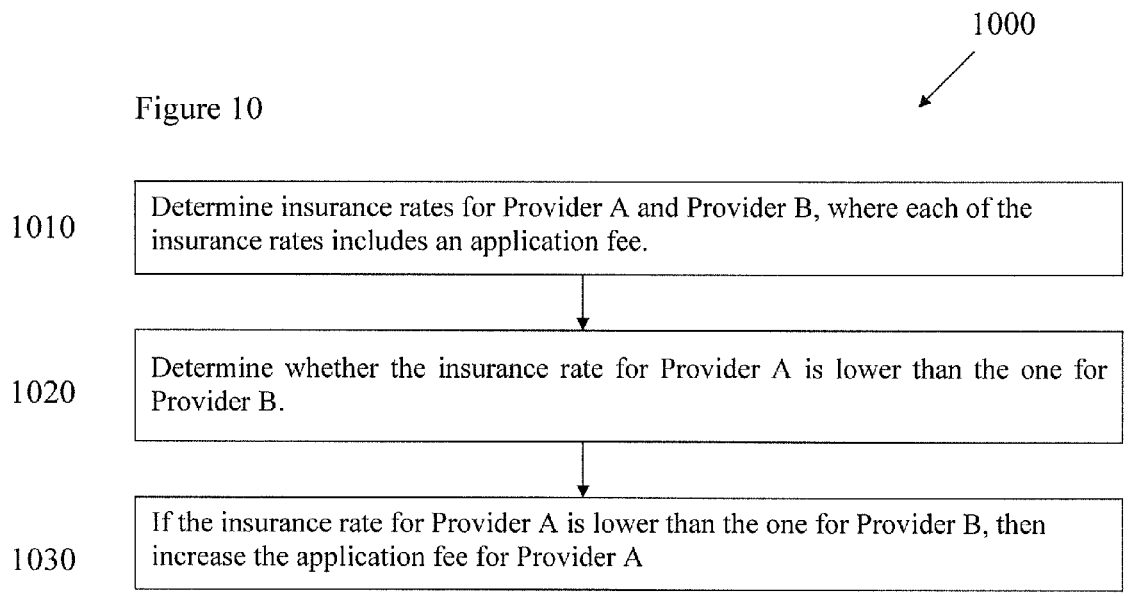
FIG. 10 shows a flowchart for a method of providing vehicle insurance quotes, according to an embodiment of the present invention.

FIG. 10 shows a flowchart 1000 for a method of providing vehicle insurance quotes, according to an embodiment of the present invention. The flowchart 1000 is shown to have various steps. Some steps may be omitted, and/or may be performed in a different order. Some steps may be performed substantially simultaneously. Some or all of the method may be performed by devices such as servers and processors. Similar devices are discussed above in context with the front-end and back-end shown in FIG. 2. Flowchart 1000, or a portion thereof, may be performable by software, hardware, and/or firmware. Flowchart 1000, or a portion thereof, may also be expressible through a set of instructions stored on one of more computer-readable storage media, such as RAM, ROM, EPROM, EEPROM, optical disk, magnetic disk, magnetic tape, and/or the like. The method illustrated by flowchart 1000 may be used in conjunction with other methods and techniques as described herein. For example, the method illustrated by flowchart 1000 may be used in conjunction with the method illustrated in FIG. 6.

At step 1010, insurance rates are determined for Provider A and Provider B. Each of these insurance rates includes the same application fee. At step 1020, these insurance rates are evaluated to determine which one is lower. At step 1030, if the insurance rate for Provider A is lower than the one for Provider B, then the application fee associated with Provider A's insurance rate is increased. It may also be possible to decrease this application fee. For example, the application fee could be decreased to create an even lower insurance rate. It may also be possible to increase or decrease the application fee associated with Provider B's insurance rate, in accordance with the techniques and principles discussed herein.

As an illustrative example, the method illustrated by flowchart 1000 can be performed in the following manner. The insurance rates for each of Providers A and B include an application fee, in addition to the provider's own rate. Provider A's rate is $300 and Provider B's rate is $350. The application fee is $25. Therefore, the insurance rate for Provider A is $300 plus the application fee of $25, which equals $325. Similarly, the insurance rate for Provider B is $375.

Thus, the insurance rate for Provider B is $50 more than the one for Provider A. The agent then raises the application fee up to $60 for the insurance rate for Provider A. The overall rate now becomes $300 plus $60, which is $360. The insurance rate for Provider A is still less than the insurance rate for Provider B. Specifically, the insurance rate for Provider A is $360, which is $15 less than the insurance rate for Provider B ($375).

The techniques disclosed herein may be used for other insurance applications such as, for example, provision of homeowner's insurance. For example, homeowner's insurance may also have underwriting classes. Such classes may include different factors, such as territory, construction type, age of dwelling, improvements, or the like. There may also be different types of homeowner's insurance, such as fire, flood, different deductibles, or the like.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. For example, features may be implemented with software, hardware, or a mix thereof. Furthermore, while embodiments disclosed herein primarily relate to vehicle insurance, many of the same principles would also apply to methods and systems for purchasing other types of insurances, such as homeowner's insurance. Therefore, it is intended that the invention not be limited to the particular embodiment disclosed, but that the invention will include all embodiments falling within the scope of the appended claims.

The invention claimed is:

1. A method of providing vehicle insurance, the method comprising:
   determining, at a server, an initial first insurance rate for Provider A and a first insurance rate for Provider B, wherein the initial first insurance rate for Provider A and the first insurance rate for Provider B correspond to a first potential customer;
   adjusting the initial first insurance rate for Provider A according to a first adjustment rule to form an adjusted first insurance rate for Provider A;
   selecting a lower of the adjusted first insurance rate for Provider A or the first insurance rate for Provider B;
   determining, at the server, a second insurance rate for Provider A and an initial second insurance rate for Provider B, wherein the second insurance rate for Provider A and the initial second insurance rate for Provider B correspond to a second potential customer;
   adjusting the initial second insurance rate for Provider B according to a second adjustment rule to form an adjusted second insurance rate for Provider B; and
   selecting a lower of the second insurance rate for Provider A or the adjusted second insurance rate for Provider B, wherein:
      the first adjustment rule adjusts the initial first insurance rate for Provider A by an amount that varies based on the first insurance rate for Provider B,
      the second adjustment rule adjusts the initial second insurance rate for Provider B by an amount that varies based on the second insurance rate for Provider A,
      the first adjustment rule adjusts rates according to a rule selected from a group consisting of a percentage dollar amount increase, a percentage dollar amount decrease, a flat dollar amount increase, and a flat dollar amount decrease, and
      the second adjustment rule adjusts rates according to a rule selected from a group consisting of a percentage dollar amount increase, a percentage dollar amount decrease, a flat dollar amount increase, and a flat dollar amount decrease.

2. The method of claim 1, wherein the adjusted first insurance rate for Provider A is greater than the initial first insurance rate for Provider A and less than the first insurance rate for Provider B.

3. The method of claim 2, wherein an application fee for the adjusted first insurance rate for Provider A is greater than an application fee for the initial first insurance rate for Provider A.

4. The method of claim 3, wherein a provider rate for the adjusted first insurance rate for Provider A is substantially the same as a provider rate for the initial first insurance rate for Provider A.

5. The method of claim 1, wherein the first insurance rate for Provider B comprises at least one of an initial first insurance rate for Provider B or an adjusted first insurance rate for Provider B.

6. The method of claim 1, wherein the second insurance rate for Provider A comprises at least one of an initial second insurance rate for Provider A or an adjusted second insurance rate for Provider A.

7. A system for providing insurance, the system comprising:
   a rules database configured to store a plurality of adjustment rules; and
   a server including a comparative rating engine and configured to:
      communicate with the rules database to receive a first adjustment rule,
      determine an initial first insurance rate for Provider A and a first insurance rate for Provider B, wherein the initial first insurance rate for Provider A and the first insurance rate for Provider B correspond to a first potential customer,
      adjust the initial first insurance rate for Provider A according to the first adjustment rule to form an adjusted first insurance rate for Provider A, and
      select a lower of the adjusted first insurance rate for Provider A or the first insurance rate for Provider B,
      determine a second insurance rate for Provider A and an initial second insurance rate for Provider B, wherein the second insurance rate for Provider A and the initial second insurance rate for Provider B correspond to a second potential customer,
      adjust the initial second insurance rate for Provider B according to a second adjustment rule to form an adjusted second insurance rate for Provider B, and
      select a lower of the second insurance rate for Provider A or the adjusted second insurance rate for Provider B,
   wherein:
      the first adjustment rule adjusts the initial first insurance rate for Provider A by an amount that varies based on the first insurance rate for Provider B,
      the second adjustment rule adjusts the initial second insurance rate for Provider B by an amount that varies based on the second insurance rate for Provider A,
      the first adjustment rule adjusts rates according to a rule selected from a group consisting of a percentage dollar amount increase, a percentage dollar amount decrease, a flat dollar amount increase, and a flat dollar amount decrease, and
      the second adjustment rule adjusts rates according to a rule selected from a group consisting of a percentage dollar amount increase, a percentage dollar amount decrease, a flat dollar amount increase, and a flat dollar amount decrease.

8. The system of claim 7, wherein the adjusted first insurance rate for Provider A is greater than the initial first insurance rate for Provider A and less than the first insurance rate for Provider B.

9. The system of claim 8, wherein an application fee for the adjusted first insurance rate for Provider A is greater than an application fee for the initial first insurance rate for Provider A.

10. The system of claim 9, wherein a provider rate for the adjusted first insurance rate for Provider A is substantially the same as a provider rate for the initial first insurance rate for Provider A.

11. The system of claim 7, wherein the first insurance rate for Provider B comprises at least one of an initial first insurance rate for Provider B or an adjusted first insurance rate for Provider B.

12. The system of claim 7, wherein the second insurance rate for Provider A comprises at least one of an initial second insurance rate for Provider A or an adjusted second insurance rate for Provider A.

13. A non-transitory computer readable medium including a set of instructions for execution by a computer, the set of instructions comprising:

a determination routine configured to determine an initial first insurance rate for Provider A and a first insurance rate for Provider B, wherein the initial first insurance rate for Provider A and the first insurance rate for Provider B correspond to a first potential customer;

an adjustment routine configured to adjust the initial first insurance rate for Provider A according to a first adjustment rule to form an adjusted first insurance rate for Provider A; and a selection routine configured to select a lower of the adjusted first insurance rate for Provider A or the first insurance rate for Provider B, a determination routine to determine a second insurance rate for Provider A and an initial second insurance rate for Provider B, wherein the second insurance rate for Provider A and the initial second insurance rate for Provider B correspond to a second potential customer, an adjustment routine to adjust the initial second insurance rate for Provider B according to a second adjustment rule to form an adjusted second insurance rate for Provider B, and a selection routine to select a lower of the second insurance rate for Provider A or the adjusted second insurance rate for Provider B, wherein:

the first adjustment rule adjusts the initial first insurance rate for Provider A by an amount that varies based on the first insurance rate for Provider B, the second adjustment rule adjusts the initial second insurance rate for Provider B by an amount that varies based on the second insurance rate for Provider A, the first adjustment rule adjusts rates according a rule selected from a group consisting of a percentage dollar amount increase, a percentage dollar amount decrease, a flat dollar amount increase, and a flat dollar amount decrease, and the second adjustment rule adjusts rates according a rule selected from a group consisting of a percentage dollar amount increase, a percentage dollar amount decrease, a flat dollar amount increase, and a flat dollar amount decrease.

14. The set of instructions of claim 13, wherein the adjusted first insurance rate for Provider A is greater than the initial first insurance rate for Provider A and less than the first insurance rate for Provider B.

15. The non-transitory computer readable medium of claim 14, wherein an application fee for the adjusted first insurance rate for Provider A is greater than an application fee for the initial first insurance rate for Provider A.

16. The non-transitory computer readable medium of claim 15, wherein a provider rate for the adjusted first insurance rate for Provider A is substantially the same as a provider rate for the initial first insurance rate for Provider A.

17. The non-transitory computer readable medium of claim 13, wherein the first insurance rate for Provider B comprises at least one of an initial first insurance rate for Provider B or an adjusted first insurance rate for Provider B.

18. The non-transitory computer readable medium of claim 13, wherein the second insurance rate for Provider A comprises at least one of an initial second insurance rate for Provider A or an adjusted second insurance rate for Provider A.

* * * * *